(12) United States Patent
Adler et al.

(10) Patent No.: US 11,807,202 B2
(45) Date of Patent: Nov. 7, 2023

(54) BRAKE SYSTEM FOR A VEHICLE

(71) Applicant: KNORR-BREMSE Systeme fuer Nutzfahrzeuge GmbH, Munich (DE)

(72) Inventors: Tamas Adler, Erd (HU); Tamas Rapp, Budapest (HU); Huba Nemeth, Budapest (HU); Kornel Straub, Pomáz (HU); Csaba Horvath, Biatorbagy (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 336 days.

(21) Appl. No.: 17/271,185

(22) PCT Filed: Aug. 29, 2019

(86) PCT No.: PCT/EP2019/073144
§ 371 (c)(1),
(2) Date: Feb. 24, 2021

(87) PCT Pub. No.: WO2020/057936
PCT Pub. Date: Mar. 26, 2020

(65) Prior Publication Data
US 2021/0188236 A1  Jun. 24, 2021

(30) Foreign Application Priority Data
Sep. 18, 2018  (EP) .................................... 18195168

(51) Int. Cl.
*B60T 13/68* (2006.01)
*B60T 13/66* (2006.01)
*B60T 17/22* (2006.01)

(52) U.S. Cl.
CPC .......... *B60T 13/683* (2013.01); *B60T 13/662* (2013.01); *B60T 17/22* (2013.01); *B60T 2270/402* (2013.01); *B60Y 2400/81* (2013.01)

(58) Field of Classification Search
CPC ...... B60T 13/683; B60T 17/22; B60T 13/662; B60T 2270/402; B60Y 2400/81
See application file for complete search history.

(56) References Cited

U.S. PATENT DOCUMENTS

| 5,294,190 A | 3/1994 | Feldmann et al. |
| 5,328,251 A | 7/1994 | Brearley |

(Continued)

FOREIGN PATENT DOCUMENTS

| CN | 1922065 A | 2/2007 |
| CN | 107735296 A | 2/2018 |

(Continued)

OTHER PUBLICATIONS

WO document No. 2020/057964 published on Mar. 26, 2020 to Adler et al.*

(Continued)

*Primary Examiner* — Pamela Rodriguez
(74) *Attorney, Agent, or Firm* — NORTON ROSE FULBRIGHT US LLP; Gerard Messina

(57) ABSTRACT

A brake system (BS) includes first/second electric-power-supply-units (EPSU), and an electronic-brake-control-unit (EBCU) connected to the first EPSU. The BS includes a first axle-pressure-modulator (APM) for service-brake-chambers for a first vehicle-axle (VA). The first APM is connected to the EBCU. The BS includes a second APM for spring-brake-cylinders for a second VA. The second APM is connected to the EBCU. The BS includes a redundant-brake-pedal-sensor (BPS) connected to the EBCU. The BS includes first/second pressure-modulators (PM), which are connected to the sec- (Continued)

ond EPSU and redundant BPS. The first/second PMs are respectively fluidically connected to the first/second APMs. The redundant-BPS issues a first control-signal (CS) for the EBCU and a second CS for controlling the first/second PMs. The first PM commands pneumatic-control-pressure for the first APM depending on the second CS from the redundant-BPS. The second PM commands pneumatic-control-pressure for the second APM depending on the second CS from the redundant-BPS.

12 Claims, 5 Drawing Sheets

(56) References Cited

U.S. PATENT DOCUMENTS

| | | | | |
|---|---|---|---|---|
| 10,525,956 B2* | 1/2020 | Farres | ............... | B60T 13/588 |
| 10,562,510 B2* | 2/2020 | Woerner | ............... | B60T 8/17 |
| 2011/0144855 A1* | 6/2011 | Herges | ............... | B60T 13/683 |
| | | | | 701/29.1 |
| 2019/0152459 A1* | 5/2019 | Dieckmann | ......... | B60T 13/662 |

FOREIGN PATENT DOCUMENTS

| | | |
|---|---|---|
| CN | 107921942 A | 4/2018 |
| DE | 102008009043 B3 | 5/2009 |
| DE | 102016005318 A1 | 11/2017 |
| EP | 2794368 B1 | 11/2015 |
| EP | 2576297 B1 | 7/2017 |
| WO | 2004098967 A2 | 11/2004 |
| WO | 2009152982 A2 | 12/2009 |
| WO | 2017017491 A1 | 2/2017 |
| WO | 2017050554 A1 | 3/2017 |

OTHER PUBLICATIONS

International Search Report for PCT/EP2019/073144, dated Dec. 2, 2019.
WABCO Vehicle Control Systems. "ECE-R13—Vehicle Regulations/Fahrzeug Vorschriften" WABCO (2004), pp. 232-365.
"Proportional Valve", Wikipedia article (2018).
"Electronic Brake System", Wikipedia article (2016).

\* cited by examiner

BRAKE SYSTEM FOR A VEHICLE

FIELD OF THE INVENTION

The present invention relates to a brake system for a vehicle, to a vehicle with the brake system, and to a method of controlling a brake system for a vehicle.

BACKGROUND INFORMATION

Autonomous or near-autonomous operation of transport vehicles is a relatively new field of technology. More sophisticated functions require special hardware infrastructure. For example, present commercial vehicle systems require the presence and attention of a driver. However, in the future the driver will be less involved in the driving control task of the vehicle, and automated systems are supposed to take over more significant driving functions, which requires increased reliability levels and consequently different types of system redundancies.

Commercial vehicles conventionally use electro-pneumatic or by-wire brake systems, wherein the electronic part of the control is realized as a single-circuit control. In case of malfunction of the control electronics, the driver is able to control the pneumatic part of the brake system by their foot because a two-circuit pneumatic backup system still is available. In case of highly automated vehicles where the driver is not in the control loop anymore, or even not available or present in the vehicle, the above brake system would be unsatisfactory, since there is no arrangement/structure which would substitute the brake control by the driver in case of malfunction of the single electronic control circuit. Therefore some redundancy is to be added to the control of a brake system.

Patent document DE 10 2008 009 043 B3 discusses a redundant brake system for a commercial vehicle. The system utilizes a parking brake integrated into an air supply unit as a redundant brake actuator. For axles not equipped with spring parking brake chambers, a control output of a trailer control module is used as pneumatic control input of axle modulators.

SUMMARY OF THE INVENTION

Against this background, it is an object of the present invention to provide an improved brake system for a vehicle, an improved vehicle with the brake system, and an improved method of controlling a brake system for a vehicle.

This object may be achieved by a brake system for a vehicle, by a vehicle with the brake system, and by a method of controlling a brake system for a vehicle according to the main claims.

According to embodiments, for example, there may be provided a redundant brake system or brake system with redundancy for a vehicle by way of a redundant foot brake sensor and associated pressure modulators redundantly performing service brake functions. In particular, a foot brake module (FBM) may be split into two main components used to provide redundancy for brake actuation. More specifically, one of the main components may be a redundant foot brake sensor arranged in a cabin of the vehicle, and the other of the main components may comprise pressure modulators, which may be placed on a chassis frame or directly on backup ports of electronic pressure modulators (EPM) or axle pressure modulators, for example. In other words, for example, a split foot brake modulator may provide additional redundancy for the brake system.

Advantageously, according to embodiments, additional redundancy can be provided by making minimum changes to a state-of-the-art brake system. Hence, costs for providing redundancy can be minimized. In particular, electric redundancy can be ensured, as opposed to pneumatically redundancy provided in conventional brake systems. Furthermore, the proposed redundant brake system has a pneumatic layout appropriate for autonomous driving applications. Thus, for example, failsafe operation of a vehicle brake system can be provided both electrically and pneumatically.

A brake system for a vehicle comprises:
- a first electric power supply unit and a second electric power supply unit;
- an electronic brake control unit, wherein the electronic brake control unit is connected to the first electric power supply unit;
- a first axle pressure modulator for service brake chambers associated with a first axle of the vehicle, wherein the first axle pressure modulator is connected to the electronic brake control unit;
- a second axle pressure modulator for spring brake cylinders associated with a second axle of the vehicle, wherein the second axle pressure modulator is connected to the electronic brake control unit;
- a redundant brake pedal sensor, wherein the redundant brake pedal sensor is connected to the electronic brake control unit; and
- a first pressure modulator and a second pressure modulator, wherein the first pressure modulator and the second pressure modulator are connected to the second electric power supply unit and to the redundant brake pedal sensor, wherein the first pressure modulator is fluidically connected to the first axle pressure modulator, wherein the second pressure modulator is fluidically connected to the second axle pressure modulator, wherein the redundant brake pedal sensor is configured to issue a first control signal for the electronic brake control unit and a second control signal for controlling the first pressure modulator and the second pressure modulator, wherein the first pressure modulator is configured to command pneumatic control pressure for the first axle pressure modulator depending on the second control signal from the redundant brake pedal sensor, wherein the second pressure modulator is configured to command pneumatic control pressure for the second axle pressure modulator depending on the second control signal from the redundant brake pedal sensor.

The vehicle may be a utility vehicle or commercial vehicle, for example a truck, bus or the like. The service brake chambers and the spring brake cylinders may represent brake actuators of the brake system. The electric power supply units may be batteries. The first and second pressure modulators may comprise electronics, which may be configured to read and interpret the control signal from the redundant foot brake sensor and translate it into a pneumatic pressure demand for brake application. The brake system may also comprise an electronic parking brake controller. The electronic parking brake controller may be connected to the second electric power supply unit. The electronic parking brake controller may be fluidically connected to the spring brake cylinders.

According to an embodiment, the first electric power supply unit and the electronic brake control unit may form part of a first service brake subsystem. The second electric power supply unit, the first pressure modulator and the second pressure modulator may form part of a second service brake subsystem. In the event of a malfunction of the first service brake subsystem, the second service brake subsystem may be usable as a redundant service brake subsystem. In other words, the second service brake subsystem may be used to redundantly perform service brake functions in the event of a malfunction of the first service brake subsystem. In particular, the first pressure modulator and the second pressure modulator may be used instead of the electronic brake control unit to perform service brake functions in the event of a malfunction of the first service brake subsystem. A brake subsystem may also be referred to as a brake circuit. Such an embodiment offers the advantage that redundancy can be added to the brake system to enhance safety, in particular for autonomous driving applications.

According to an embodiment, the redundant brake pedal sensor may be configured to issue the control signals as electric signals. The first pressure modulator may be configured to command the pneumatic control pressure as a proportional pressure. The second pressure modulator may be configured to command the pneumatic control pressure as a proportional pressure. Such an embodiment offers the advantage that electric redundancy can be provided in a reliable and simple manner.

According to an embodiment, the first pressure modulator may be arranged closer to the first axle pressure modulator than to the redundant brake pedal sensor. The second pressure modulator may be arrangeable or arranged closer to the second axle pressure modulator than to the redundant brake pedal sensor. The redundant brake pedal sensor may be arrangeable or arranged in a cabin of the vehicle. Such an embodiment offers the advantage that pneumatic lines can be eliminated from the cabin of the vehicle.

According to an embodiment, the first pressure modulator may be configured to control a backup port of the first axle pressure modulator. The second pressure modulator may be configured to control a backup port of the second axle pressure modulator. Such an embodiment offers the advantage that the control pressure the axle pressure modulators can be commanded in a reliable and simple manner.

According to an embodiment, the first pressure modulator and the second pressure modulator may be combined in a modulator unit. The modulator unit may be mountable or mounted to a chassis frame of the vehicle. Such an embodiment offers the advantage that manufacturing costs can be reduced because only one unit is to be installed.

According to an embodiment, the redundant brake pedal sensor may be configured to issue the control signals via electric lines or via a wireless connection. Correspondingly, the pressure modulators may be configured to receive the control signals via electric lines or via a wireless connection. Such an embodiment offers the advantage that the control signals can be transmitted safely and reliably according to a vehicle requirements.

According to an embodiment, the brake system may comprise a trailer control module for controlling braking functions of a trailer of the vehicle. The trailer control module may be connected to the electronic brake control unit. An electronic parking brake controller may be fluidically connected to the trailer control module. Such an embodiment offers the advantage that also a trailer may be connected to the vehicle, which acts as a tractor, and reliably connected to the redundant brake system.

According to an embodiment, the brake system may comprise a third pressure modulator. The third pressure modulator may be fluidically connected to the trailer control module. The third pressure modulator may be connected to the redundant brake pedal sensor. The redundant brake pedal sensor may be configured to issue the second control signal for controlling the third pressure modulator. The third pressure modulator may be configured to pneumatically control the trailer control module depending on the second control signal from the redundant brake pedal sensor. The third pressure modulator unit may be arrangeable or arranged closer to the trailer control module than to the redundant brake pedal sensor. Such an embodiment offers the advantage that the redundant execution of service brake functions can also be implemented in a simple and reliable manner for a trailer connected to the vehicle as a tractor. Furthermore, brake application can be controlled independently for tractor and trailer.

According to an embodiment, the third pressure modulator may be configured to pneumatically control the trailer control module depending on trailer load. Such an embodiment offers the advantage that electric redundancy may be provided in a simple and reliable manner not only for a vehicle used as a tractor but also for a trailer.

A vehicle comprises:
an embodiment of the aforementioned the brake system;
the first axle, with which the first axle pressure modulator of the brake system is associated; and
the second axle, with which the second axle pressure modulator of the brake system is associated.

The first axle pressure modulator may be mounted in the vicinity of the first axle. Further elements of the brake system associated with the first axle pressure modulator, such as the first pressure modulator, the service brake chambers and valves, may also be mounted in the vicinity of the first axle. The second axle pressure modulator may be mounted in the vicinity of the second axle. Further elements of the brake system associated with the second axle pressure modulator, such as the second pressure modulator, the spring brake cylinders, may also be mounted in the vicinity of the second axle.

A method of controlling a brake system for a vehicle, wherein the brake system is an embodiment of the aforementioned brake system, comprises:
receiving an error signal representing a malfunction of the first electric power supply unit, the electronic brake control unit, the first axle pressure modulator or the second axle pressure modulator or a malfunction of the second electric power supply unit, the first pressure modulator or the second pressure modulator; and
transmitting service brake commands of the vehicle to the first pressure modulator and the second pressure modulator in the event of a malfunction of the first electric power supply unit, the electronic brake control unit, the first axle pressure modulator or the second axle pressure modulator or to the electronic brake control unit in the event of a malfunction of the second electric power supply unit, the first pressure modulator or the second pressure modulator.

The method or the steps of the method may be executed using a controller. Thus, the method may be executed to control an embodiment of the aforementioned brake system.

Embodiments of the approach presented here shall be explained in greater detail in the subsequent description with reference to the figures.

DETAILED DESCRIPTION

Figure 1:
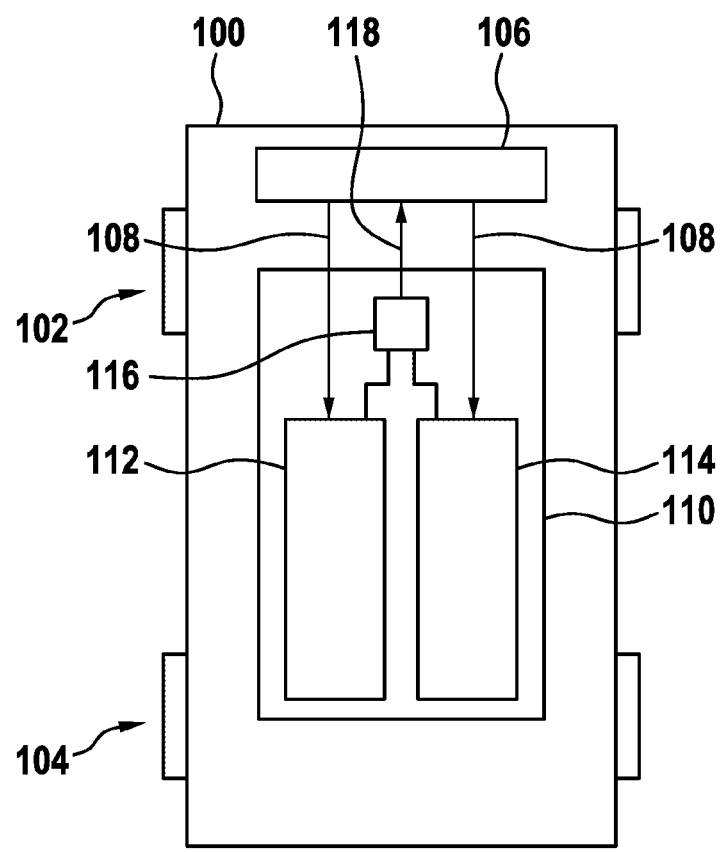
FIG. 1 shows a schematic illustration of a vehicle comprising a brake system according to an embodiment of the present invention.

In the following description of advantageous embodiments of the present invention, the same or similar reference numerals shall be used for the elements depicted in the various figures and acting in a similar way, wherein repeated description of these elements shall be omitted.

FIG. 1 shows a schematic illustration of a vehicle 100 comprising a brake system 110 according to an embodiment of the present invention. The vehicle 100 is a utility vehicle or commercial vehicle, such as a truck. The vehicle 100 comprises a first axle 102 and a second axle 104, according to this embodiment. Furthermore, the vehicle 100 comprises a controller 106 and the brake system 110. The controller 106 is configured to control the brake system 110 by a command signal 108. In particular, the command signal 108 represents service brake commands for performing service brake functions of the brake system 110. Alternatively, the controller 106 also be part of the brake system 110.

The brake system 110 comprises a first service brake subsystem 112 and a second service brake subsystem 114. The first service brake subsystem 112 is configured to perform service brake functions of the brake system. The second service brake subsystem 114 is configured to perform service brake functions of the brake system 110 as a backup or to provide redundancy instead of the first service brake subsystem 112.

The brake system 110 further comprises a monitoring device 116 for monitoring a state of health of the first service brake subsystem 112 and the second service brake subsystem 114. Alternatively, the monitoring device 116 may also be part of a system other than the brake system 110. The monitoring device 116 is connected to the first service brake subsystem 112 and to the second service brake subsystem 114. The monitoring device 116 is configured to detect a potential malfunction of the first service brake subsystem 112 or of the second service brake subsystem 114. The monitoring device 116 is configured to output an error signal 118 to the controller 106. The error signal 118 represents a malfunction of the first service brake subsystem 112 or of the second service brake subsystem 114.

In response to the error signal 118, the controller 106 is configured to transmit the command signal 108 to either the first service brake subsystem 112 or the second service brake subsystem 114. More specifically, the controller 106 is configured to transmit the command signal 108 to that subsystem 112 or 114 free from malfunction, as indicated by the error signal 118.

Figure 2:
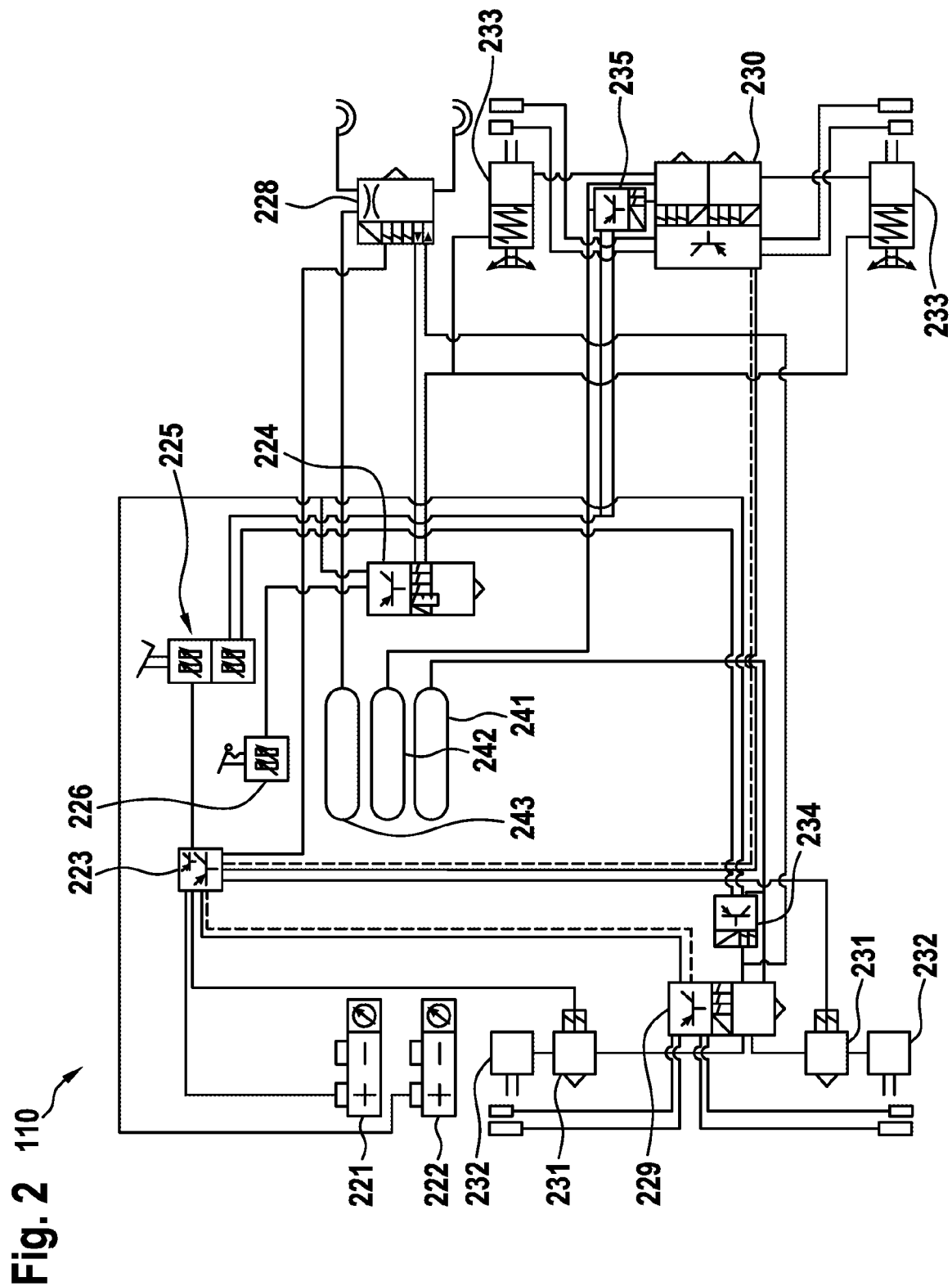
FIG. 2 shows a schematic illustration of a brake system according to an embodiment of the present invention.

FIG. 2 shows a schematic illustration of a brake system 110 according to an embodiment of the present invention. The brake system 110 is a brake system 110 for a vehicle, specifically a commercial vehicle or utility vehicle, e.g. a truck. The brake system 110 corresponds or is similar to the brake system shown in FIG. 1.

The brake system 110 comprises a first electric power supply unit 221, a second electric power supply unit 222, an electronic brake control unit 223, a redundant brake pedal sensor 225, a first or front axle pressure modulator 229, a second or rear axle pressure modulator 230, two service brake chambers 232, two spring brake cylinders 233, a first pressure modulator 234 and a second pressure modulator 235. According to this embodiment, the brake system 110 further comprises an electronic parking brake controller 224, a park brake lever sensor 226, a trailer control module 228, two pressure control valves 231, a first compressed air supply module 241, a second compressed air supply module 242 and a third compressed air supply module 243.

The first electric power supply unit 221 and the electronic brake control unit 223 form part of the first service brake subsystem described with reference to FIG. 1. The second electric power supply unit 222, the redundant brake pedal sensor 225, the first pressure modulator 234 and the second pressure modulator 235 form part of the second service brake subsystem described with reference to FIG. 1. In the event of a malfunction of the first service brake subsystem, the second service brake subsystem is usable as a redundant service brake subsystem, or in other words to perform service brake functions of the brake system 110.

The first electric power supply unit 221 is electrically connected to the electronic brake control unit 223. The electronic brake control unit 223 is electrically connected to the first axle pressure modulator 229 via an analogous electric signal and supply line and via a digital electric signal line. Furthermore, the electronic brake control unit 223 is electrically connected to the second axle pressure modulator 230 via an analogous electric signal and supply line and via a digital electric signal line. Also, the electronic brake control unit 223 is electrically connected to the pressure control valves 231, to the trailer control module 228 and to the redundant brake pedal sensor 225 via analogous electric signal and supply lines.

The first axle pressure modulator 229 is fluidically connected to the first compressed air supply module 241 via a pneumatic supply line. Also, the first axle pressure modulator 229 is fluidically connected to the pressure control valves 231 via pneumatic service brake control lines. Each of the pressure control valves 231 is fluidically connected to a respective one of the service brake chambers 232 via a pneumatic service brake control line. The first axle pressure modulator 229, the control valves 231 and the service brake chambers 232 are associated with a first axle of the vehicle. Furthermore, the first axle pressure modulator 229 is electrically connected to a group of brake sensors for the first axle via analogous electric signal and supply lines.

The second axle pressure modulator 230 is fluidically connected to the second compressed air supply module 242 via a pneumatic supply line. Furthermore, the second axle pressure modulator 230 is fluidically connected to the spring brake cylinders 233 via pneumatic service brake control lines. The second axle pressure modulator 230 and the spring brake cylinders 233 are associated with a second axle of the vehicle. Also, the second axle pressure modulator 230 is electrically connected to a group of brake sensors for the second axle via analogous electric signal and supply lines.

The second electric power supply unit 222 is electrically connected to the electronic parking brake controller 224, the first pressure modulator 234 and the second pressure modulator 235. The electronic parking brake controller 224 is electrically connected to the first pressure modulator 234 and the second pressure modulator 235 via analogous electric signal and supply lines. Furthermore, the electronic parking brake controller 224 is electrically connected to the park brake lever sensor 226 via an analogous electric signal and supply line. The electronic parking brake controller 224 is fluidically connected to the spring brake cylinders 233 via pneumatic parking brake control lines. Also, the electronic parking brake controller 224 is fluidically connected to the trailer control module 228 via a pneumatic parking brake control line.

The redundant brake pedal sensor 225 is configured to issue a first control signal for the electronic brake control unit 223. In particular, the redundant brake pedal sensor 225 is configured to issue the first control signal as an electric signal. The redundant brake pedal sensor 225 is electrically connected to the first pressure modulator 234 via an analogous electric signal and supply line. Also, the redundant brake pedal sensor 225 is electrically connected to the second pressure modulator 235 via an analogous electric signal and supply line. The redundant brake pedal sensor 225 is configured to issue a second control signal for controlling the first pressure modulator 234 and the second pressure modulator 235. In particular, the redundant brake pedal sensor 225 is configured to issue the second control signal as an electric signal. Alternatively, the redundant brake pedal sensor 225 is configured to issue the control signals via a wireless connection instead of via electric lines.

The first pressure modulator 234 is fluidically connected to the first compressed air supply module 241 via a pneumatic supply line. Furthermore, the first pressure modulator 234 is fluidically connected to the first axle pressure modulator 229 via a pneumatic service brake control line. The first pressure modulator 234 is configured to command pneumatic control pressure for the first axle pressure modulator 229 depending on the second control signal from the redundant brake pedal sensor 225. In particular, the first pressure modulator 234 is configured to command the pneumatic control pressure as a proportional pressure. More specifically, the first pressure modulator 234 is configured to control a backup port of the first axle pressure modulator 229. The first pressure modulator 234 is arranged closer to the first axle pressure modulator 229 than to the redundant brake pedal sensor 225. In particular, the first pressure modulator 234 may be arranged on the backup port of the first axle pressure modulator 229.

The second pressure modulator 235 is fluidically connected to the second compressed air supply module 242 via a pneumatic supply line. Furthermore, the second pressure modulator 235 is fluidically connected to the second axle pressure modulator 230 via a pneumatic service brake control line. The second pressure modulator 235 is configured to command pneumatic control pressure for the second axle pressure modulator 230 depending on the second control signal from the redundant brake pedal sensor 225. In particular, the second pressure modulator 235 is configured to command the pneumatic control pressure as a proportional pressure. More specifically, the second pressure modulator 235 is configured to control a backup port of the second axle pressure modulator 230. The second pressure modulator 235 is arranged closer to the second axle pressure modulator 230 than to the redundant brake pedal sensor 225. In particular, the second pressure modulator 235 may be arranged on the backup port of the second axle pressure modulator 230.

The trailer control module 228 is configured to control braking functions of a trailer coupled to the vehicle. The trailer control module 228 is fluidically connected to the third compressed air supply module 243 via pneumatic supply line.

In other words, FIG. 2 shows an architecture of a brake system 110 commercial, which may also be referred to as a schematic a redundant commercial vehicle electronic or electro-pneumatic brake system 110 (EBS). The electro-pneumatic brake system 110 comprises the following main components. The brake system 110 is redundantly supplied by the electric power supply units 221 and 222, which may be batteries. The EBS electronic brake control unit 223 is supplied from the first electric power supply unit 221 or first battery 221. The electronic brake control unit 223 is configured to electronically control the front or first axle pressure modulator 229, the pressure control valves 231 on the front or first axle, the rear or second axle pressure modulator 230 and the trailer control module 228. Front or first axle wheel brakes are actuated by the service brake chambers 232. Rear or second axle wheel brakes are actuated by the spring brake cylinders 233 or spring brake combi cylinders.

The redundant pair of the brake system 110 is provided by the electronic redundant foot brake modulators (rFBM), i.e. the first pressure modulator 234 and the second pressure modulator 235, which are actuating the backup ports of the front or first axle pressure modulator 229 and the rear or second axle pressure modulator 230. In particular, the redundant brake architecture describes a redundant brake-by-wire system as the brake system 110, wherein pneumatic components are eliminated from the cabin of the vehicle, and the pneumatic part of the foot brake module, i.e. the first pressure modulator 234 and the second pressure modulator 235, can be installed near the first and second axle modulators 229 and 230 to reduce pneumatic pipes and improve system response. Outputs of the of the rFBM modules, i.e. the first pressure modulator 234 and the second pressure modulator 235, provide pneumatic command for the first and second axle modulators 229 and 230. Service brakes can be commanded by the driver by the redundant brake pedal sensor 225, which provides separate demand signals for both the electronic brake control unit 223 and the first and second pressure modulators 234 and 235. The first and second pressure modulators 234 and 235 can be standalone units or integrated into any other modules like a compressed air processing unit or standalone electronic parking brake controller 224. Furthermore, according to another embodiment, the first and second pressure modulators 234 and 235 can be integrated into the first and second axle modulators 229 and 230, respectively.

When the brake system 110 is fully intact, the service brake is controlled by the electronic brake control unit 223 as a master. The electronic brake control unit 223 electronically controls the first and second axle pressure modulators 229 and 230 and the trailer control module 228. In case of a malfunction of the electronic brake control unit 223 or the first electric power supply unit 221, brake control is taken over by the first and second pressure modulators 234 and 235, and axles equipped with the first and second axle modulators 229 and 230 are controlled pneumatically through the backup ports of the first and second axle modulators 229 and 230. In case the first and second pressure modulators 234 and 235 or the second electric power supply unit 222 has any malfunction, the electronic brake control unit 223 is configured to control the brake system 110 as in the normal case. A parking brake function can also be temporally simulated in this case by way of service brake actuation.

Figure 3:
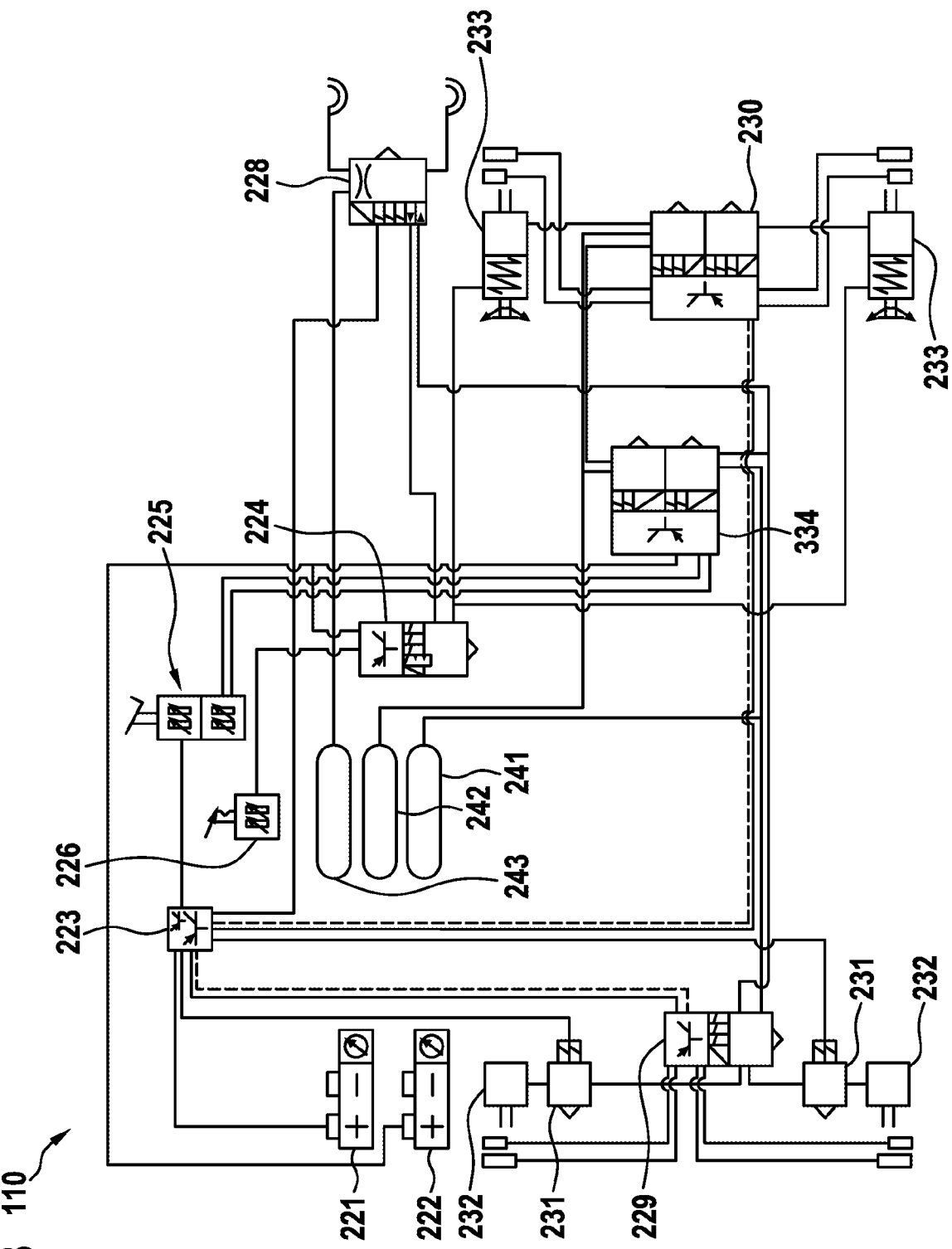
FIG. 3 shows a schematic illustration of a brake system according to an embodiment of the present invention.

FIG. 3 shows a schematic illustration of a brake system 110 according to an embodiment of the present invention. The brake system 110 shown in FIG. 3 corresponds to the brake system shown in FIG. 2 with the exception of the first pressure modulator and the second pressure modulator both combined in a single modulator unit 334. The modulator unit 334 comprises the first pressure modulator and the second pressure modulator or functions as the pressure modulator and the second pressure modulator. Furthermore, the modulator unit 334 comprises an electronic control unit (ECU).

The modulator unit 334 is mounted to a chassis frame of the vehicle 100, for example. Pneumatic ports of the modulator unit 334 are connected to the backup ports of the first and second axle modulators 229 and 230. According to this embodiment, only one additional unit, i.e. the modulator unit 334, needs to be installed in the vehicle, thus optimizing manufacturing costs. In other words, in a centralized version, a single modulator unit 334 or actuator unit is installed in the vehicle. A number of channels of the modulator unit 334 may vary according to vehicle configuration.

Figure 4:
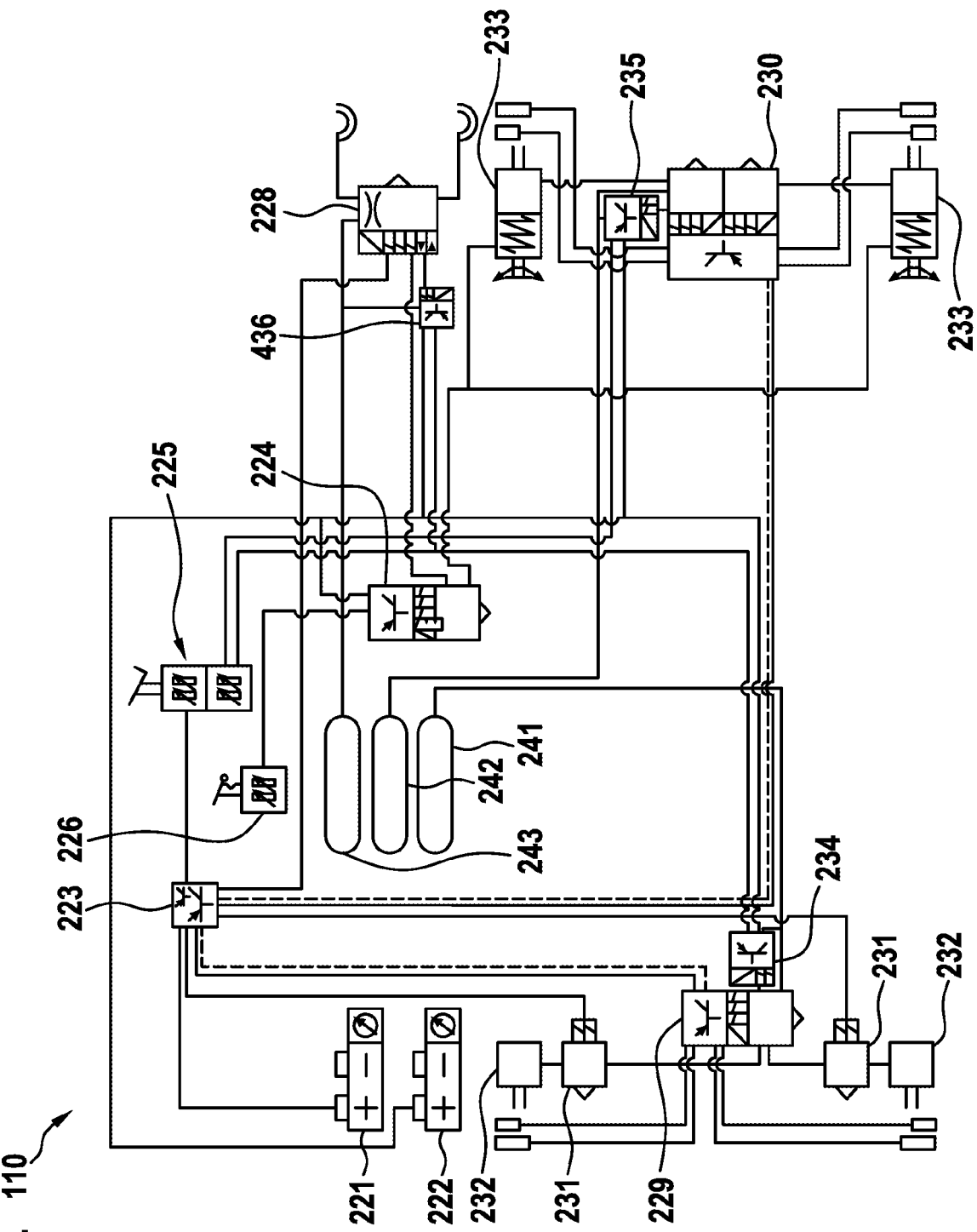
FIG. 4 shows a schematic illustration of a brake system according to an embodiment of the present invention.

FIG. 4 shows a schematic illustration of a brake system 110 according to an embodiment of the present invention. The brake system 110 shown in FIG. 4 corresponds to the brake system shown in FIG. 2 with the exception of a third pressure modulator 436.

The third pressure modulator 436 is fluidically connected to the trailer control module 228 via a pneumatic service brake control line. The third pressure modulator 436 is electrically connected to the second electric power supply unit 222. Also, the third pressure modulator 436 is electrically connected to the redundant brake pedal sensor 225 via an analogous electric signal and supply line. The redundant brake pedal sensor 225 is configured to issue the second control signal for controlling the third pressure modulator 436. The third pressure modulator 436 is configured to pneumatically control the trailer control module 228 depending on the second control signal from the redundant brake pedal sensor 225. For example, the third pressure modulator 436 is configured to pneumatically control the trailer control module 228 depending on trailer load. In particular, the third pressure modulator unit 436 is arranged closer to the trailer control module 228 than to the redundant brake pedal sensor 225.

According to this embodiment, because the third pressure modulator 436 is installed for the trailer control module 228, the control pressure for the trailer can be modulated independently.

Figure 5:
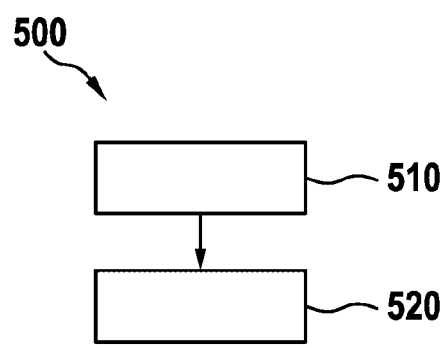
FIG. 5 shows a flowchart of a method of controlling a brake system according to an embodiment of the present invention.

FIG. 5 shows a flowchart of a method 500 of controlling a brake system according to an embodiment of the present invention. The method 500 is executable in connection with the brake system as described with reference to one of the preceding figures or a similar brake system.

In general, the method 500 can be executed in connection with a brake system for a vehicle. Such a brake system comprises a first electric power supply unit and a second electric power supply unit, an electronic brake control unit, wherein the electronic brake control unit is connected to the first electric power supply unit, a first axle pressure modulator for service brake chambers associated with a first axle of the vehicle, wherein the first axle pressure modulator is connected to the electronic brake control unit, a second axle pressure modulator for spring brake cylinders associated with a second axle of the vehicle, wherein the second axle pressure modulator is connected to the electronic brake control unit, a redundant brake pedal sensor, wherein the redundant brake pedal sensor is connected to the electronic brake control unit, and a first pressure modulator and a second pressure modulator, wherein the first pressure modulator and the second pressure modulator are connected to the second electric power supply unit and to the redundant brake pedal sensor, wherein the first pressure modulator is fluidically connected to the first axle pressure modulator, wherein the second pressure modulator is fluidically connected to the second axle pressure modulator, wherein the redundant brake pedal sensor is configured to issue a first control signal for the electronic brake control unit and a second control signal for controlling the first pressure modulator and the second pressure modulator, wherein the first pressure modulator is configured to command pneumatic control pressure for the first axle pressure modulator depending on the second control signal from the redundant brake pedal sensor, wherein the second pressure modulator is configured to command pneumatic control pressure for the second axle pressure modulator depending on the second control signal from the redundant brake pedal sensor.

The method 500 of controlling comprises a step 510 of receiving an error signal representing a malfunction of the first electric power supply unit, the electronic brake control unit, the first axle pressure modulator or the second axle pressure modulator or a malfunction of the second electric power supply unit, the first pressure modulator or the second pressure modulator. Furthermore, the method 500 of controlling comprises a step 520 of transmitting service brake commands of the vehicle to the first pressure modulator and the second pressure modulator in the event of a malfunction of the first electric power supply unit, the electronic brake control unit, the first axle pressure modulator or the second axle pressure modulator or to the electronic brake control unit in the event of a malfunction of the second electric power supply unit, the first pressure modulator or the second pressure modulator.

With reference to the aforementioned figures, according to an embodiment, there may be provided a brake system 110 for a vehicle 100, wherein a redundant brake circuit is equipped with an electrified foot brake module, in which the redundant foot brake sensor 225 or sensor unit is separated from the pressure modulators 234, 235, 334 and/or 436 or actuator parts, wherein communication therebetween is effected by an electronic arrangement/structure.

THE REFERENCE NUMERAL LIST IS AS FOLLOWS 100 vehicle
102 first axle
104 second axle
106 controller
108 command signal
110 brake system
112 first service brake subsystem
114 second service brake subsystem
116 monitoring device
118 error signal
221 first electric power supply unit
222 second electric power supply unit
223 electronic brake control unit
224 electronic parking brake controller
225 redundant brake pedal sensor
226 park brake lever sensor
228 trailer control module
229 first axle pressure modulator
230 second axle pressure modulator
231 pressure control valve
232 service brake chamber
233 spring brake cylinder
234 first pressure modulator
235 second pressure modulator
241 first compressed air supply module
242 second compressed air supply module
243 third compressed air supply module
334 modulator unit 436 third pressure modulator
500 method of controlling
510 step of receiving
520 step of transmitting

The invention claimed is:

1. A brake system for a vehicle, comprising:
a first electric power supply unit;
a second electric power supply unit;
an electronic brake control unit, wherein the electronic brake control unit is connected to the first electric power supply unit;
a first axle pressure modulator for service brake chambers associated with a first axle of the vehicle, wherein the first axle pressure modulator is connected to the electronic brake control unit;
a second axle pressure modulator for spring brake cylinders associated with a second axle of the vehicle, wherein the second axle pressure modulator is connected to the electronic brake control unit;
a redundant brake pedal sensor, wherein the redundant brake pedal sensor is connected to the electronic brake control unit; and
a first pressure modulator and a second pressure modulator, wherein the first pressure modulator and the second pressure modulator are connected to the second electric power supply unit and to the redundant brake pedal sensor, wherein the first pressure modulator is fluidically connected to the first axle pressure modulator, wherein the second pressure modulator is fluidically connected to the second axle pressure modulator, wherein the redundant brake pedal sensor is configured to issue a first control signal for the electronic brake control unit and a second control signal for controlling the first pressure modulator and the second pressure modulator, wherein the first pressure modulator is configured to command pneumatic control pressure for the first axle pressure modulator depending on the second control signal from the redundant brake pedal sensor, and wherein the second pressure modulator is configured to command pneumatic control pressure for the second axle pressure modulator depending on the second control signal from the redundant brake pedal sensor.

2. The brake system of claim 1, wherein the first electric power supply unit and the electronic brake control unit form part of a first service brake subsystem, wherein the second electric power supply unit, the first pressure modulator and the second pressure modulator form part of a second service brake subsystem, and wherein in the event of a malfunction of the first service brake subsystem the second service brake subsystem is usable as a redundant service brake subsystem.

3. The brake system of claim 1, wherein the redundant brake pedal sensor is configured to issue the control signals as electric signals, and wherein the first pressure modulator is configured to command the pneumatic control pressure as a proportional pressure and the second pressure modulator is configured to command the pneumatic control pressure as a proportional pressure.

4. The brake system of claim 1, wherein the first pressure modulator is arrangeable or arranged closer to the first axle pressure modulator than to the redundant brake pedal sensor, and wherein the second pressure modulator is arrangeable or arranged closer to the second axle pressure modulator than to the redundant brake pedal sensor.

5. The brake system of claim 1, wherein the first pressure modulator is configured to control a backup port of the first axle pressure modulator, and wherein the second pressure modulator is configured to control a backup port of the second axle pressure modulator.

6. The brake system of claim 1, wherein the first pressure modulator and the second pressure modulator are combined in a modulator unit, and wherein the modulator unit is mountable or mounted to a chassis frame of the vehicle.

7. The brake system of claim 1, wherein the redundant brake pedal sensor is configured to issue the control signals via electric lines or via a wireless connection.

8. The brake system of claim 1, further comprising:
a trailer control module for controlling braking functions of a trailer of the vehicle, wherein the trailer control module is connected to the electronic brake control unit.

9. The brake system of claim 8, further comprising:
a third pressure modulator, wherein the third pressure modulator is fluidically connected to the trailer control module, wherein the third pressure modulator is connected to the redundant brake pedal sensor, wherein the redundant brake pedal sensor is configured to issue the second control signal for controlling the third pressure modulator, wherein the third pressure modulator is configured to pneumatically control the trailer control module depending on the second control signal from the redundant brake pedal sensor, and wherein the third pressure modulator unit is arrangeable or arranged closer to the trailer control module than to the redundant brake pedal sensor.

10. The brake system of claim 9, wherein the third pressure modulator is configured to pneumatically control the trailer control module depending on a trailer load.

11. A vehicle, comprising:
a brake system, the brake system including:
a first electric power supply unit;
a second electric power supply unit;
an electronic brake control unit, wherein the electronic brake control unit is connected to the first electric power supply unit;
a first axle pressure modulator for service brake chambers associated with a first axle of the vehicle, wherein the first axle pressure modulator is connected to the electronic brake control unit;
a second axle pressure modulator for spring brake cylinders associated with a second axle of the vehicle, wherein the second axle pressure modulator is connected to the electronic brake control unit;
a redundant brake pedal sensor, wherein the redundant brake pedal sensor is connected to the electronic brake control unit; and
a first pressure modulator and a second pressure modulator, wherein the first pressure modulator and the second pressure modulator are connected to the second electric power supply unit and to the redundant brake pedal sensor, wherein the first pressure modulator is fluidically connected to the first axle pressure modulator, wherein the second pressure modulator is fluidically connected to the second axle pressure modulator, wherein the redundant brake pedal sensor is configured to issue a first control signal for the electronic brake control unit and a second control signal for controlling the first pressure modulator and the second pressure modulator, wherein the first pressure modulator is configured to command pneumatic control pressure for the first axle pressure modulator depending on the second control signal from the redundant brake pedal sensor, and wherein the second pressure modulator is configured to command pneumatic control pressure for the second axle pressure modulator depending on the second control signal from the redundant brake pedal sensor.

12. A method of controlling a brake system for a vehicle, the method comprising:
receiving an error signal representing a malfunction of a first electric power supply unit, an electronic brake control unit, a first axle pressure modulator or a second axle pressure modulator or a malfunction of a second electric power supply unit, a first pressure modulator or a second pressure modulator; and
transmitting service brake commands of the vehicle to the first pressure modulator and the second pressure modulator in the event of a malfunction of the first electric power supply unit, the electronic brake control unit, the first axle pressure modulator or the second axle pressure modulator or to the electronic brake control unit in the event of a malfunction of the second electric power supply unit, the first pressure modulator or the second pressure modulator;
wherein the brake system includes:
the first electric power supply unit;
the second electric power supply unit;
the electronic brake control unit, wherein the electronic brake control unit is connected to the first electric power supply unit;
the first axle pressure modulator for service brake chambers being associated with a first axle of the vehicle, wherein the first axle pressure modulator is connected to the electronic brake control unit;
the second axle pressure modulator for spring brake cylinders being associated with a second axle of the vehicle, wherein the second axle pressure modulator is connected to the electronic brake control unit;
a redundant brake pedal sensor, wherein the redundant brake pedal sensor is connected to the electronic brake control unit; and
the first pressure modulator and the second pressure modulator, wherein the first pressure modulator and the second pressure modulator are connected to the second electric power supply unit and to the redundant brake pedal sensor, wherein the first pressure modulator is fluidically connected to the first axle pressure modulator, wherein the second pressure modulator is fluidically connected to the second axle pressure modulator, wherein the redundant brake pedal sensor is configured to issue a first control signal for the electronic brake control unit and a second control signal for controlling the first pressure modulator and the second pressure modulator, wherein the first pressure modulator is configured to command pneumatic control pressure for the first axle pressure modulator depending on the second control signal from the redundant brake pedal sensor, and wherein the second pressure modulator is configured to command pneumatic control pressure for the second axle pressure modulator depending on the second control signal from the redundant brake pedal sensor.

* * * * *